Feb. 24, 1931. J. C. McCUNE 1,793,627
SAFETY CAR CONTROL EQUIPMENT
Filed Nov. 1, 1928
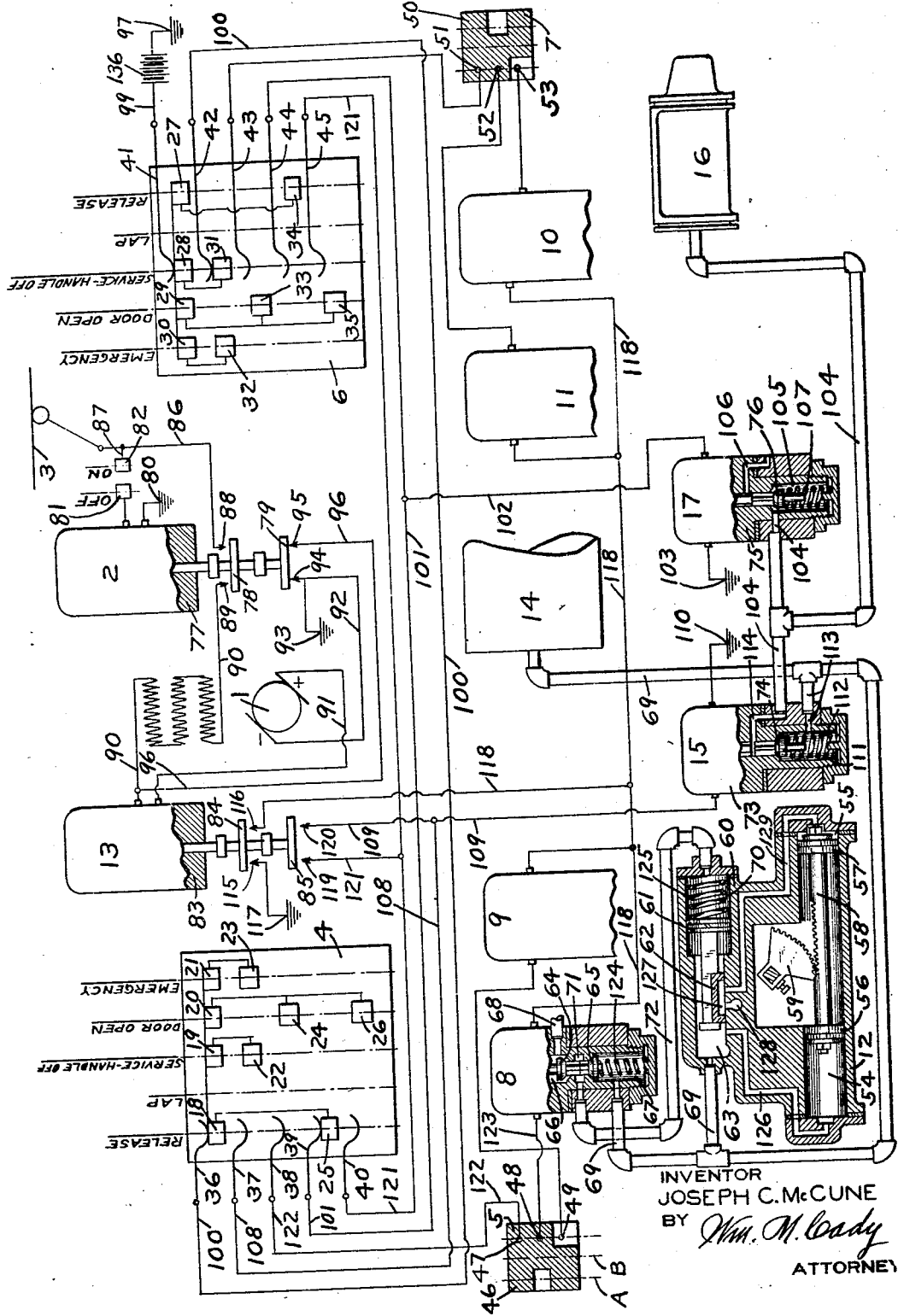
INVENTOR
JOSEPH C. McCUNE
BY Wm. M. Cady
ATTORNEY Patented Feb. 24, 1931

1,793,627

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY CAR-CONTROL EQUIPMENT

Application filed November 1, 1928. Serial No. 316,539.

This invention relates to fluid pressure brakes and car door controlling apparatus and more particularly to safety car control equipment.

With the ordinary safety car control equipment, the operator may, in bringing the car to a stop, first effect a heavy application of the brakes and then, as the speed of the car is reduced, graduate the brake application off. When the speed of the car is reduced to the speed which the operator, in his judgment, thinks safe to open the door or doors, he operates the usual brake valve device to door open position in which, the door or doors are opened, thus the time for opening the door or doors and the speed of the car at the time the doors are opened is entirely dependent upon the operator's judgment.

Further, when the operator moves the brake valve of the ordinary safety car control equipment to door open position, a full service application of the brakes is effected, and this heavy application of the brakes, especially when the car is operating at slow speed, causes the car to come to a sudden stop which is very objectionable in that it places undue strain on the brake rigging and car as a whole, and also causes discomfort to the passengers in the car.

The principal object of my invention is to provide an improved safety car control equipment in which the opening of the car door or doors is dependent upon the speed of the car, and which will be free from the above mentioned objectionable features.

Another object of my invention is to provide an improved safety car control equipment having means operative automatically for preventing the opening of the car door or doors until the speed of the car has been reduced to a predetermined low speed.

A further object of my invention is to provide an improved safety car control equipment having means for maintaining the supply of fluid under pressure to the brake cylinder closed off, and for preventing the door or doors from opening when the equipment is in door open position, until the speed of the car is reduced to a predetermined low speed.

A still further object of my invention is to provide an improved safety car control equipment in which, with the equipment in door open position, a full service application of the brakes can be effected only after the speed of the car is reduced to a predetermined low speed.

Other objects and advantages will appear from the following more detailed description.

In the accompanying drawing, the single figure is a diagrammatic view, partly in section, of a safety car control equipment embodying my invention, only such portions of the equipment being shown as is deemed necessary to a clear understanding of the invention.

The safety car control equipment shown in the drawing is of the double end type and may comprise an electric motor 1 for driving the car, a magnet switch device 2 which is operative through the operation of the usual controller (not shown) for controlling the flow of electric current from the trolley wire 3 or other current supply source to the motor 1, a brake control switch device 4 and a door selector switch device 5 at one end of the car, a brake control switch device 6 and a door selector switch device 7 at the other end of the car, a magnet valve devices 8, 9, 10 and 11, each of which is operative to control the operation of a door engine 12, only one of the engines being shown, a door relay magnet switch device 13, a reservoir 14, a magnet valve device 15 operative to control the supply of fluid under pressure to the usual brake cylinder 16 to apply the brakes and a magnet valve device 17 operative to control the discharge of fluid pressure from the brake cylinder to release the brakes.

Each of the brake control switches 4 and 6 may comprise a rotatable contact drum which is shown diagrammatically in the drawing and may be operated through the medium of the usual operating handle (not shown), the operating positions of the handle being designated on the drawing.

The drum of the control switch 4 is provided with electrically connected contacts 18 to 26 inclusive and the switch 6 is provided with like contacts 27 to 35 inclusive. The arrangement of the contacts on the drums of the switches 4 and 6 are identical and have been given separate reference characters only for the purpose of rendering the description more clear.

The brake control switch 4 may also comprise contact terminals 36 to 40 inclusive which are adapted to contact with the contacts on the drum of the switch, and the control switch 6 is provided with like contact terminals 41 to 45 inclusive.

Each of the selector switches 5 and 7 may comprise a rotatable drum which is shown diagrammatically in the drawing and may be operated by the use of the usual operating handle (not shown).

The drum of the selector switch 5 is provided with a contact 46 adapted to contact with contact terminals 47, 48 and 49, and the drum of the selector switch 7 is provided with a contact 50 adapted to contact with contact terminals 51, 52 and 53.

Each of the door engines 12 may comprise a casing having piston chambers 54 and 55 containing respectively, pistons 56 and 57, said pistons being connected by a rack bar 58 having teeth meshing with the teeth of a quadrant 59. Upon the operation of the pistons, the quadrant 59 will be operated to open or close one of the doors of the car.

For controlling the flow of fluid under pressure for operating the pistons 56 and 57, a valve device 60 may be employed, comprising a piston 61 and a slide valve 62 contained in a valve chamber 63 and adapted to be operated by said piston.

The operation of the valve device 60 is controlled through the operation of the magnet valve device 8 which may comprise a magnet for controlling the operation of double beat valves 64 and 65 contained in valve chambers 66 and 67 respectively, the chamber 66 being connected to atmosphere through a passage 68 and the chamber 67 being connected to the reservoir 14 through pipe and passage 69.

The valve chamber 63 in the valve device 60 is connected to the reservoir 14 by way of passage and pipe 69 and the piston chamber 70 at the opposite side of the piston 61 is connected to a chamber 71 in the magnet valve device 8 through passage and pipe 72.

The application magnet valve device 15 may comprise a magnet 73 and a valve 74 controlled by said magnet. The release magnet valve device 17 may comprise a magnet 75 and a valve 76 controlled by the magnet 75.

The magnet switch device 2 may comprise a magnet 77 and connectors 78 and 79 controlled by said magnet. One terminal of the magnet may be permanently connected to ground at 80 and the other terminal is connected to a contact 81 with which a contact 82 of the usual controller (not shown) is adapted to engage in all on positions of the controller.

The door relay magnet valve device 13 may comprise a magnet 83 and connectors 84 and 85 controlled by said magnet.

As shown in the drawing the brake control switch device 4 at the head end of the car is in release position and the brake control switch 6 at the rear of the car is in handle off position and the brakes released. The car controller is also in off position. Now when the controller is turned to on position, the contact 82 will engage the contact 81 and current from the trolley wire 3 will flow through the current supply wire 86, branch wire 87, contacts 82 and 81, and through the magnet 77 to ground 80 thus energizing the magnet which causes the connectors 78 and 79 to be moved upwardly. The connector 78 in its upper position connects contact terminals 88 and 89 and current from the supply wire 86 will flow through the contact terminal 88, connector 78, contact terminal 89, a wire 90, magnet 83, wire 91, motor 1, and wire 92 to ground at 93, thus completing the motor circuit causing the motor to operate to drive the car.

Now, if it is desired to render the motor inoperative to drive the car, the car motor controller is operated to power off position, the contact 82 is moved out of contact with the contact 81 opening the circuit through the magnet 77 and causing it to be deenergized. Upon the deenergization of the magnet 77, the connector 78 will move downwardly out of connecting engagement with the contacts 88 and 89 thus opening the motor circuit, and the connector 79 will move downwardly into contact with contact terminals 94 and 95. Connected to the contact terminal 94 is the wire 92 and connected to the contact terminal 95 is a wire 96 which is also connected to the wire 90 connected to one terminal of the magnet 83.

The momentum of the car now causes the motor 1 to be driven and the counter E. M. F. of the motor causes an electric current to flow through wire 91, magnet 83, wire 90, wire 96, contact terminal 95, connector 79, contact terminal 94 and back to the motor through wire 92, thus providing a circuit through which the magnet 83 is maintained energized after the circuit through the connector 78 is opened.

With the control switch device 4 at one end of the car in release position and the control switch device 6 at the other end of the car in handle off position, current from a battery 136, having one terminal permanently connected to ground at 97, flows through wire 99, contact 41, contacts 28 and 31 of the switch device 6, contact 42, a wire 100, contact 36, contacts 18 and 25 of the switch device 4, contact 39, a wire 101, a branch wire 102, through the magnet 75 of the release magnet valve device 17 to ground at 103, thus maintaining the magnet 75 energized and the brake cylinder vented to atmosphere by way of pipe and passage 104, valve chamber 105 containing the release valve 76, past the unseated valve 76 and its fluted stem and through an atmospheric passage 106.

If it is desired to bring the car to a stop after the motor controller device has been operated to power off position, the brake controlling switch device 4 is operated from release position to service position. When the switch device 4 is operated from release position the circuit through the magnet 75 of the release magnet valve device 17 is opened thus deenergizing the magnet. Upon deenergization of this magnet the pressure of a spring 107 contained in the valve chamber 105 of the release magnet valve device 17, causes the release valve 76 to seat, closing off communication of the brake cylinder 16 with atmosphere. With the switch device 4 in service position the contacts 36 and 37 engage the contacts 19 and 22 of the switch device, so that current from the battery 136 supplied to the contact 36 will flow to the magnet 73 of the application magnet valve device 15 through contacts 19, 22 and 37, wire 108 and a branch wire 109, then through the magnet 73 to ground at 110, thus energizing the magnet 73.

Upon the energization of the magnet 73 the application valve 74 will be unseated against the pressure of a spring 111 contained in a valve chamber 112 and fluid under pressure flows from the reservoir 14 to the brake cylinder 16 by way of pipe and passage 113, valve chamber 112 in the application magnet valve device 15, past the unseated valve 74 and its fluted stem, a passage 114 and pipe 104, thus effecting a service application of the brakes.

Now when the speed of the car has been reduced to such an extent that the counter E. M. F. of the motor is not sufficient to maintain the magnet 83 of the door relay magnet switch device 13 energized, the connectors 84 and 85 move downwardly to their lowermost positions, in which the connector 84 connects contact terminals 115 and 116, the contact terminal 115 being connected to ground at 117 and the contact terminal 116 being connected to the return wire 118 from the door controlling magnets 8, 9, 10 and 11, and the connector 85 connects contact terminals 119 and 120, the contact terminal 119 being connected to a wire 121 which in turn is connected to the contacts 40 and 45 of the brake control switch devices 4 and 6, and the contact terminal 120 being connected to the wire 109.

If after the speed of the car has been reduced to a predetermined low speed, the operator desires to open the door controlled by the magnet valve device 8, he maintains the door selector switch device 5 in the position shown in the drawing, if he desires to open the door controlled by the magnet valve device 9 he operates the selector switch device 5 to the position as indicated by the reference letter A, or if he desires to open both doors he operates the selector switch device to the position as indicated by the reference letter B.

Assuming the selector valve device 5 to be in the position shown in the drawing, the car operating at slow speed, and the operator operates the control switch device 4 from service position to door open position, the contacts 36, 38 and 40 will engage with the contacts 20, 24 and 26 respectively of the control switch device. With the contact 38 in engagement with the contact 24, current supplied to the contact 36 will flow through the contacts 20 and 24, contact 28, a wire 122 connected to contact terminal 47, contact 46 of the selector switch device, contact terminal 48, wire 123, magnet of the magnet valve device 8, wire 118, contact terminal 116, connector 84, contact terminal 115 to ground 117, thus energizing the magnet of the magnet valve device 8. The contact 46 is made of any suitable material which will conduct current from the contact terminal 47 to either or both of the contact terminals 48 and 49 depending, of course, upon the position of the contact 46.

Upon the energization of the magnet of the magnet valve device 8, the valve 64 is caused to seat and the valve 65 to unseat against the pressure of a spring 124 contained in the valve chamber 67, the seating of the valve 64 closing communication of the chamber 71 with atmosphere. With the valve 65 unseated fluid under pressure flows from the reservoir 14 to the piston chamber 70 of the valve device 60 by way of pipe and passage 69, chamber 67, past the unseated valve 65, chamber 71 and pipe and passage 72. When the pressure of fluid in piston chamber 70, acting on one side of the piston 61, is substantially equal to the pressure of fluid in valve chamber 63, acting on the other side of the piston, the pressure of a spring 125, contained in the piston chamber 70 and acting on one side of the piston 61, causes the piston to operate to shift the slide valve 62 toward the left hand to its door open position, in which the piston chamber 54 of the door engine is vented to the atmosphere by way of passage 126, cavity 127 in the slide valve 62 and atmospheric passage 128. In this position of the slide valve fluid under pressure from the reservoir 14 is supplied to the piston chamber 55 of the door engine by way of pipe and passage 69, valve chamber 63 of the valve device 60 and passage 129. Since the chamber 54 is vented to atmosphere the pressure of fluid supplied to the piston chamber 55 and acting on the piston 57 causes the pistons 56 and 57 and rack bar 58 to move toward the left hand to operate the quadrant to open the door.

It will here be noted that when the brake control switch 4 is operated to door open position, the contact 37 is moved out of engagement with the contact 22 of the control switch so that the circuit through the wire 108 and application magnet is open, but as the connector 85 of the door relay magnet switch device 13 contacts with the contact terminals 119 and 120 and the contact 40 engages the contact 26 of the switch device 4 current is supplied through the application magnet 73 by way of contact 36, contacts 20 and 26 of the switch device 4, contact 40, wire 121, contact terminal 119 connector 85, contact terminal 120 and wire 109 and a full service application will result.

If in effecting an application of the brakes the operator moves the brake control switch device 4 to door open position before the speed of the car has been reduced to a predetermined low speed, the counter E. M. F. of the motor 1 will cause the magnet 83 of the door relay magnet valve device 13 to be maintained energized thus maintaining the connectors 84 and 85 in their upper positions as shown in the drawing. The connector 84 in its upper position maintains the circuit through the magnet of the magnet valve devce 8 open, thus preventing the opening of the door, and the connector 85 in its upper position, maintains the circuit through the magnet 73 of the application magnet valve device 15 open, and since the contact 37 is out of engagement with the contact 22 of the control switch device 4, the magnet 73 will be deenergized and the application valve 74 seated, so that the pressure of fluid in the brake cylinder 16 will not be increased nor can it be increased without operating the switch 4 to service position again.

Now when the speed of the car is reduced to said predetermined low speed, i. e. when the counter E. M. F. of the motor 1 is not sufficient to maintain the magnet 83 of the door relay magnet switch device 13 energized, the contact 84 moves downwardly into contact with contacts 115 and 116 thus completing the circuit through the magnet of the magnet valve device 8 causing the door to open and the contact 85 moves downwardly into contact with the contacts 119 and 120 thus completing the circuit through the magnet 73 of the application magnet valve device 15 causing the valve 74 to unseat when fluid under pressure is again supplied to the brake cylinder and a full service application of the brakes result.

In effecting an emergency application of the brakes, the contacts 36 and 37 engage the contacts 21 and 23 of the brake control switch device 4 thus closing a circuit through the magnet 73 of the application magnet valve device 15 through which the magnet 73 is energized which results in an emergency application of the brakes without in any way being interfered with by the relay magnet switch device 13.

It will be seen that with my improved safety car control equipment, the opening of the doors is dependent upon the speed of the car and not upon the judgment of the operator.

The term "predetermined low speed" as used in the foregoing specification and appended claims is intended to mean a speed at which it would be safe to open the car doors.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a car door and brake controlling apparatus, the combination with mechanism for controlling the opening of a car door and mechanism for effecting an application of the brakes, of means operative to normally control the operation of said mechanisms, and means operative for preventing the operation of both of said mechanisms, when the first mentioned means is in door open position, unless the speed of the car is reduced to a predetermined low degree.

2. In a car door and brake controlling apparatus, the combination with mechanism for controlling the opening of a car door and mechanism for effecting an application of the brakes, of means for normally controlling the operation of said mechanisms, and means operative in accordance with the speed of the car for rendering both of said mechanisms either operative or inoperative when the first mentioned means is in door opening position.

3. In a car door and brake controlling apparatus, the combination with mechanism for controlling the opening of a car door and mechanism for effecting an application of the brakes, of means for normally controlling the operation of said mechanisms, and electrical means operative for preventing the operation of both of said mechanisms, when the first mentioned means is in door open position, unless the speed of the car is reduced to a predetermined low degree.

4. In a car door and brake controlling apparatus, the combination with mechanism for controlling the opening of a car door and mechanism for effecting an application of the brakes, of means for normally controlling the operation of said mechanisms, and electrical means including the car driving motor operative for preventing the operation of both of said mechanisms, when the first mentioned means is in door open position, unless the speed of the car is reduced to a predetermined low degree.

5. In a door and brake controlling apparatus, the combination with a door engine operated by fluid under pressure for controlling the opening and closing of a car door, of means for supplying fluid under pressure to said door engine to effect the opening of the car door, a brake cylinder, means for supplying fluid under pressure to said brake cylinder to effect an application of the brakes, and means operated when the speed of the car exceeds a predetermined low speed for cutting off communications through which fluid under pressure is supplied to said door engine and to said brake cylinder.

6. In a door and brake controlling apparatus, the combination with a mechanism for controlling the opening of a car door and mechanism for effecting an application of the brakes, means operative to a position to control the operation of said mechanisms to open the door and to effect an application of the brakes, and means subject to the speed of the car for rendering said mechanisms operative or inoperative to open the door and effect an application of the brakes.

7. In a door and brake controlling apparatus, the combination with a mechanism for controlling the opening of a car door and mechanism for effecting an application of the brakes, means operative to a position to control the operation of said mechanisms to open the door and to effect an application of the brakes, and a switch device operative in accordance with the speed of the car for rendering said mechanisms operative or inoperative.

8. In a door and brake controlling apparatus, the combination with a mechanism for controlling the opening of a car door and mechanism for effecting an application of the brakes, means operative to a position to control the operation of said mechanisms to open the door and to effect an application of the brakes, a magnet switch device operative upon energization to prevent the operation of said mechanisms, and operative upon deenergization to cause said mechanisms to operate, and means for controlling the energization and deenergization of said magnet switch device in accordance with the speed of the car.

9. In a door and brake controlling apparatus, the combination with a mechanism for controlling the opening of a car door and mechanism for effecting an application of the brakes, means operative to a position to control the operation of said mechanisms to open the door and to effect an application of the brakes, and means for preventing the operation of said mechanisms unless the speed of the car is reduced to a predetermined low speed.

10. In a car door and brake controlling apparatus, the combination with a door engine and a brake cylinder, of electrically controlled means for supplying fluid under pressure simultaneously to said engine and brake cylinder to open the car door and apply the brakes only when the speed of the train is reduced to a predetermined low speed.

11. In a car door and brake controlling apparatus, the combination with a door engine and a brake cylinder, of electrically controlled means for supplying fluid under pressure simultaneously to said engine and brake cylinder to open the car door and apply the brakes, and means operative when the speed of the car is greater than a predetermined low speed for preventing the operation of said electrically controlled means to supply fluid under pressure to said door engine and brake cylinder.

12. In a car door and brake controlling apparatus, the combination with a door engine operative by fluid under pressure for controlling the opening and closing of a car door, means for supplying fluid under pressure to said door engine to effect the opening of the door, means operative by fluid under pressure for effecting an application of the brakes, and means operative when the speed of the car exceeds a predetermined low speed for preventing the operation of said door engine and the means for effecting an application of the brakes and operative when the speed of the car is reduced to said predetermined low speed for causing said door engine to operate to open the door and the means for effecting an application of the brakes to operate to apply the brakes.

13. In a car door and brake controlling apparatus, the combination with a door engine operative by fluid under pressure for controlling the opening and closing of a car door, means for supplying fluid under pressure to said door engine to effect the opening of the door, means operative by fluid under pressure for effecting an application of the brakes, a manually operative switch device for simultaneously operating said door engine and means, and an automatically operative switch device controlled in accordance with the speed of the car for rendering said engine and means operative or inoperative.

14. In a door and brake controlling apparatus for a motor driven vehicle, the combination with a mechanism for controlling a vehicle door and a mechanism for controlling the brakes of means for operating both of said mechanisms simultaneously for opening the door and effecting an application of the brakes, and means for preventing the operation of said mechanisms by the operating means to open the door and apply the brakes, including an electrically controlled device having its circuit controlled according to the counter-electro-motive-force of the vehicle motor.

15. In a door and brake controlling apparatus for a motor driven vehicle, the combination with a motor adapted to drive said vehicle, an electric circuit for controlling the operation of said motor, a magnet switch device for maintaining said circuit closed when current is being supplied to said motor and operative to open said circuit and to close a local circuit through said motor when the current supply is cut off, mechanism for opening a car door, a mechanism for effecting an application of the brakes, and means included in said local motor circuit operative in accordance with counter-electro-motive-force of said motor for controlling the simultaneous operation of both of said mechanisms.

16. In a door and brake controlling apparatus for a motor driven vehicle, the combination with a mechanism for operating a vehicle door to open position and a mechanism for effecting an application of the brakes, of a manually operative switch device and a magnet switch device for controlling the operation of both of said mechanisms, a vehicle propelling motor, an electric circuit for controlling the operation of said motor to propel the vehicle, said circuit including said magnet switch device, a magnet switch device operative to open the motor circuit when the power to said motor is cut off and to close a circuit through said motor and magnet switch device, said magnet switch device being operative at one time by the current flowing through the first mentioned circuit to prevent the operation of the door opening mechanism and operative at another time by the counter-electro-motive-force of the motor for preventing the simultaneous operation of both of said mechanisms to open the door and apply the brakes until the speed of the vehicle is reduced to a predetermined low speed.

17. In a car door and brake controlling apparatus, the combination with a door engine operative by fluid under pressure for opening and closing the car door and a brake cylinder, of a magnet valve device operative to supply fluid under pressure to said door engine to open said door, a magnet valve device operative to supply fluid under pressure to the brake cylinder to effect an application of the brakes, an electric circuit through which the operation of the second mentioned magnet valve device is controlled to supply fluid under pressure to the brake cylinder, a manually operative switch device having a position for closing said circuit, another electric circuit through which the operation of the second mentioned magnet valve device is controlled to supply fluid under pressure to the brake cylinder, an electric circuit through which the first mentioned magnet valve device is controlled to supply fluid under pressure to said door engine to open the car door, said manually operative switch device being movable to another position in which the first mentioned circuit is opened for closing off the supply of fluid under pressure to the brake cylinder and for establishing the two last mentioned circuits through the switch device, and means operated in accordance with the speed of the car for maintaining the two last mentioned circuits open or for closing said circuits.

18. In a car door and brake controlling apparatus, the combination with a mechanism for opening and closing the car door and a mechanism for controlling the application and release of the brakes, of a manually operative switch device having one position for controlling the operation of the second mentioned mechanism to effect an application of the brakes and having another position for controlling the operation of the first mentioned mechanism to open the door and for controlling the second mentioned mechanism to effect an application of the brakes, and means for preventing the operation of both of said mechanisms to open the door and apply the brakes when said manually operative switch device is in its last mentioned position, until the speed of the car is reduced to a predetermined low speed.

19. In a car door and brake controlling apparatus, the combination with a mechanism for opening and closing the car doors, and a mechanism for controlling the application and release of the brakes, of a manually operative switch device having one position for controlling the operation of the second mentioned mechanism to effect an application of the brakes and having another position for controlling the operation of the first mentioned mechanism to open the door and for controlling the second mentioned mechanism to effect an application of the brakes, and means governed by the speed of the car for either preventing the operation of both of said mechanisms or causing both of said mechanisms to operate to open the car door and apply the brakes when the manually operative switch is in the last mentioned position.

20. In a car door and brake controlling apparatus, the combination with a mechanism for opening and closing the car door and a mechanism for controlling the application and release of the brakes, of a manually operative switch device having one position for controlling the operation of the second mentioned mechanism to effect an application of the brakes and having another position for controlling the operation of the first mentioned mechanism to open the door and for controlling the second mentioned mechanism to effect an application of the brakes, and electrically controlled means for preventing the operation of both of said mechanisms to open the door and apply the brakes when said manually operative switch device is in its last mentioned position, until the speed of the car is reduced to a predetermined low speed.

In testimony whereof I have hereunto set my hand, this 30th day of October, 1928.

JOSEPH C. McCUNE.